TRANSDUCERS

Filed Nov. 21, 1960 2 Sheets-Sheet 1

Peter Rippon Chen
George Victor Planer
INVENTORS

BY
Pierce, Scheffler & Parker
ATTORNEYS

Dec. 10, 1963 PETER R. CHEN ETAL 3,114,122

TRANSDUCERS

Filed Nov. 21, 1960 2 Sheets-Sheet 2

Peter Rippon Chen
George Victor Planer
INVENTORS

BY
Pierce, Scheffler & Parker
ATTORNEYS

United States Patent Office 3,114,122
Patented Dec. 10, 1963

3,114,122

TRANSDUCERS

Peter R. Chen and George V. Planer, Sunbury-on-Thames, England, assignors to Cosmocord Limited Filed Nov. 21, 1960, Ser. No. 70,454
Claims priority, application Great Britain Nov. 19, 1959
11 Claims. (Cl. 338—32)

This invention relates to transducers, and is more particularly concerned with transducers in which the transducing element includes a material which exhibits the magneto-resistive or Hall effects.

The element used in transducers of this kind may take a variety of forms, but in certain circumstances it is highly advantageous to use an element in the form of a Corbino disc. In its classic form the Corbino disc consists of a disc or annulus of the active material with a central electrode and a peripheral electrode, so that the current flow is substantially radial. For the purposes of the present invention the expression "Corbino disc" is to be taken as including this classical form, and also similar forms, in which current flow is at least in part from an inner to one or more outer electrodes, in non-parallel current paths.

Where the Corbino disc is made of magneto-resistive or Hall effect material it may be required both to keep the element extremely thin, and also to provide electrodes upon it which do not materially increase the overall thickness of the element, as otherwise the air gap in the magnetic circuit in which the Corbino disc is disposed will have to be increased.

The present invention is concerned with a method of preparing Corbino discs of material of the kind mentioned, which enables a very thin element of the material to be produced. In particular, the invention is concerned with a method of providing suitable terminals upon the element.

Broadly, the present invention consists of a method of preparing a magneto-resistive element, which comprises preparing a support surface, applying an adherent layer of insulation to said surface, attaching a thin discrete disk of magneto-resistive material to said insulation layer by securing the lower face of the disc to the surface of the insulation layer, thereafter working the exposed surface of the upper face of said disc so as to produce a plane surface, and thereafter establishing electrical connection between separate regions of the disc of magneto-resistive material and terminal means provided respectively for the separate regions.

Other features and advantages of the invention will appear from the following description of embodiments thereof, in conjunction with the accompanying drawings, in which.

Figures 1, 2, 3, 4, 5, 6:
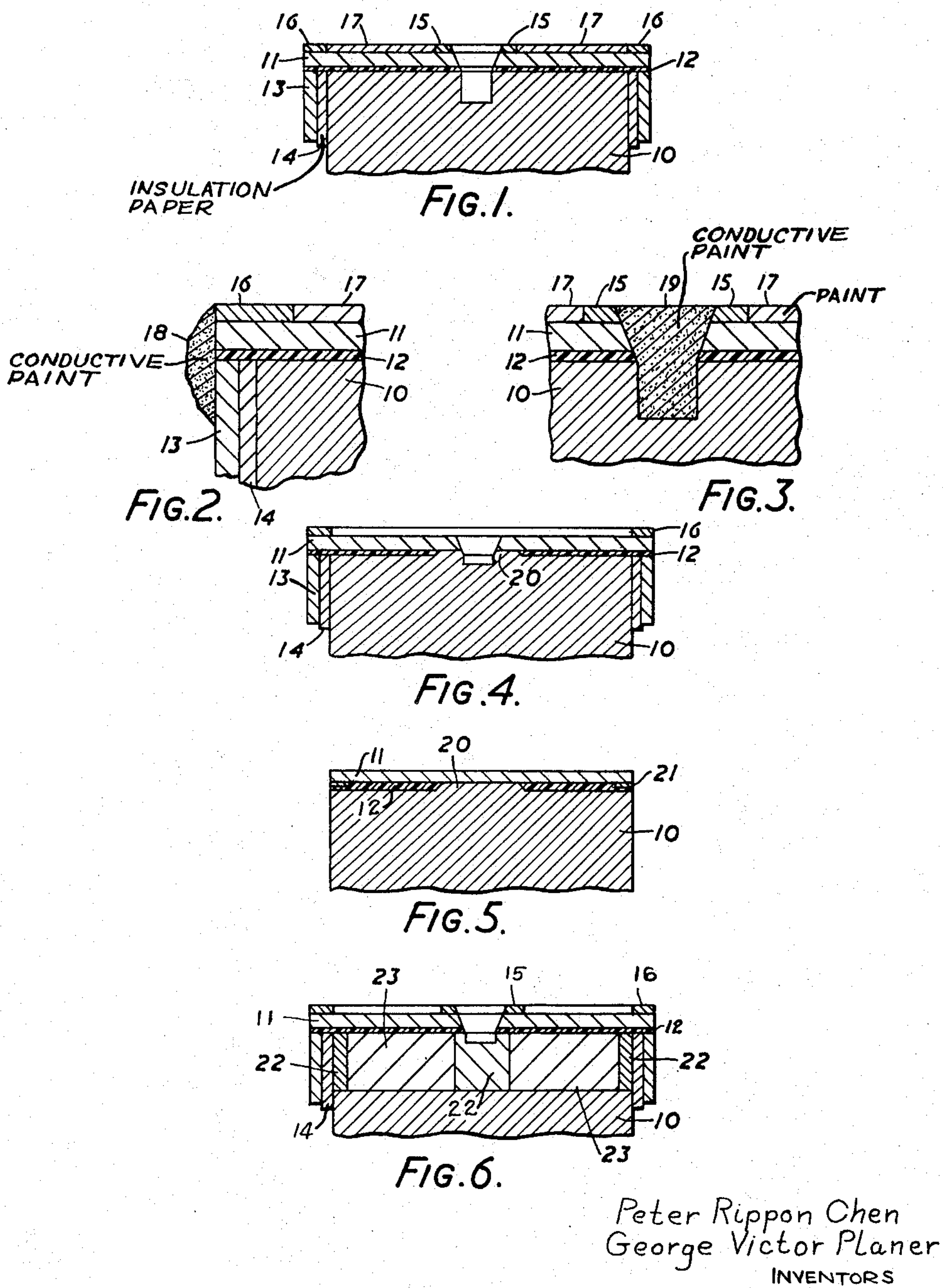
FIGURE 1 is a cross-section through one form of the invention.
FIGURE 2 is a fragmentary cross-section, on an enlarged scale, of the outer part of FIGURE 1.
FIGURE 3 is a fragmentary cross-section, on an enlarged scale of the inner part of FIGURE 1.
FIGURE 4 is a cross-section through a modified form of the invention.
FIGURE 5 is a cross-section of a modified form of the invention.
FIGURE 6 is a cross-section of another form of the invention.

In one form of the invention there is provided a transducer comprising a base of magnetic material, to a face of which a thin disc of magneto-resistive material is secured. A device of this kind is shown in FIGURE 1, and comprises a cylindrical base or pedestal 10 having on an end face a disc 11 of magneto-resistive material, for example, indium antimonide with interposed insulation 12. Surrounding the end of the cylinder is an annular terminal 13 spaced from the pedestal 10 by an insulator 14, and on the disc 11 are inner and outer electrodes 15, 16 respectively connected to pedestal 10 and terminal 13.

In making a device of this kind, a thin disc is cut from a zone refined ingot of the active material, using a thin slitting saw with a suitable lubricant, such as a glycerine-water mixture containing a small quantity of silicon carbide. The disc is polished roughly flat on both surfaces with a sheet abrasive of about 400 grade, until the disc is about 20–30 mils thick. The disc is next mounted on a flat lapping disc and is polished using successively fine abrasives.

The pedestal is prepared, from a suitable magnetic material, for example, steel or soft iron rod. One, and preferably both end faces are ground flat. conveniently the end faces are parallel. Around one end are wound turns of a strip of paper or like insulating material to form insulation sleeve 14. A brass ring 13 is located on the insulation and secured by a heat-cured resin, the edge of the ring being flush with the level of the face.

A thin layer of resin, such as an epoxy resin, is applied to the ground face of the pedestal assembly and the polished lower face of the disc is pressed into contact with it. After curing, this resin provides the insulation 12.

When this resin has been cured the exposed upper face of the disc is ground and polished, with successively fine abrasives, to the desired thickness. In one example, the thickness of the disc after polishing is about 10–20 microns.

The exposed surface of the disc 11, where the surface electrode is not required, as at 17 in FIGURE 1, is covered with a masking lacquer or paint, and inner and outer electrodes 15, 16 are formed by electroplating in a copper cyanide plating bath. To obviate the effect of any gap between the respective electrodes and pedestal 10 or ring 13 a conductive silver paint can be used to bridge any small crevices. For example, as shown in FIGURE 2, a ring of conductive paint 18 can be used to extend over any gap that might form between electrode 16 and the ring 13; FIGURE 3 shows how a similar conductive paint can be used at 19 to cover the gap between electrode 15 and pedestal 10. In either case, in place of conductive paint, the bridging connections can be formed by coating the appropriate parts with, say, colloidal graphite and then electro-depositing a conductive layer on the deposits.

The process of providing the necessary electrodes on the disc 11 includes drilling a hole, by normal or supersonic drilling, through the centre of the disc, the underlying insulation and into the pedestal 10, as indicated in FIGURE 1.

The embodiment of the invention described can be modified in various ways. One modification is indicated in FIGURE 4. This construction is similar to that of FIGURES 1 to 3 except that a different central electrode arrangement is used. In FIGURE 4, the top surface of the pedestal is first shaped so that it has a central raised portion 20 on which the disc 11 rests directly; the interposed insulating layer 12 does not extend over the surface of the projecting part.

FIGURE 5 shows a further modified form. Like the construction of FIGURE 4 the pedestal is formed with a projection 20, but in this case an electrode ring 21 is used on the lower face of disc 11. The insulating layer provides the desired insulation between the parts.

It will be understood that in use the disc of magneto-resistive material will be immersed in a magnetic field of variable field strength, the lines of force running generally at right angles to the plane of the disc. That part of the disc which lies immediately under or over the electrode such as 15, 16 does not assist in producing a useful output and any magnetic flux passing through these areas is of no use. To use the available magnetic flux more efficiently, a construction of pedestal such as is shown in FIGURE 6 can be used.

In the construction of FIGURE 6, the arrangement of the disc 11 and the electrodes are as in FIGURES 1 to 3 and will not be further described, but the part of the pedestal adjacent the disc is formed partly of non-magnetic material at 22 beneath electrodes 15, 16 and partly of magnetic material at 23 beneath the active area of the disc. In this way the available magnetic flux will be concentrated in the active parts of the disc. The parts 23 can be integral with the rest of the pedestal.

Instead of mounting the disc 11 on a relatively massive pedestal such as 10, the disc can be mounted on a support which it itself very thin. For such a support glass, brass Phosphor bronze steel and ferrite have been found satisfactory, but other materials can be used. In such units the disc is prepared and electroded as described above and connecting leads attached to the electrode.

In either case the completed units are stabilised by heat treatment for about 30 mins. at about 50° C.

Figure 7:
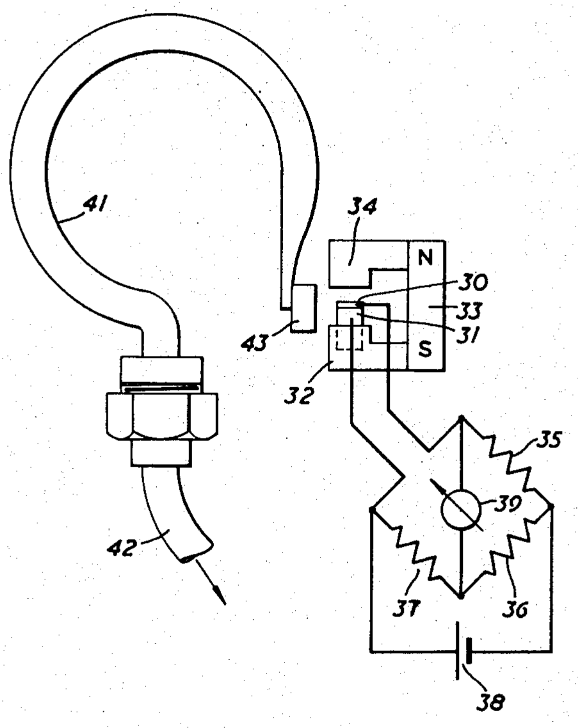
FIGURE 7 is a diagram of a fluid pressure responsive transducer device using a Corbino disc element.

An element of the kind shown in FIGURES 1 to 6 can be used in a variety of transducing devices, and an example of such a transducing device is shown in FIGURE 7. The showing of FIGURE 7 is largely diagrammatic, and parts of it are exaggerated in size for the purpose of illustration.

The device shown comprises a Corbino disc element 30 mounted on a pedestal 31. The pedestal is of magnetic material, and the pedestal and element can be fashioned in any of the ways described above in relation to FIGURES 1 to 6. The pedestal 31 is partly embedded in a pole-piece 32 of an assembly including a permanent magnet 33; the other pole-piece 34 of the magnetic assembly has a poleface which lies adjacent the Corbino element 30. The connections to the element 30 form part of a Wheatstone bridge completed by resistors 35, 36 and 37. The bridge is energised by a voltage source 38 applied to one diagonal of the bridge and across the other diagonal is arranged any suitable form of current responsive means or current indicator 39.

The device described is arranged to respond to changes of pressure, and for this purpose a Bourdon gauge tube 41 is attached to a fluid pressure source at 42. The free end of the Bourdon gauge tube carries an armature 43 of high permeability magnetic material, disposed adjacent the air gap formed in the magnetic circuit, between the element 30 and the pole-piece 34.

At an initial pressure condition, the bridge is balanced, for example by adjustment of resistor 35, made variable for this purpose. In this condition no current will be indicated by the indicator 39. When pressure is applied to source 42, the armature 42 will be moved towards the magnetic air gap, thereby to divert some of the magnetic flux between pole-piece 34 and pole-piece 32, and thereby vary the flux in the air gap between pole-piece 34 and element 30. In consequence of the change of magnetic flux in which the element 30 is immersed, the resistance of element will vary, and thereby the bridge 30, 35, 36, 37 will be unbalanced to a greater or lesser degree; the indications of indicator 39 will vary accordingly, as a function of the pressure of the source at 42.

It will be understood that the device described is one only of many forms of transducing device that can make use of an element of Corbino form, and the invention is not to be taken as limited in its application to the one form of transducer described. Moreover, the term "disc" as used in the appended claims in defining the magneto-resistive element is intended to include any thin plate-like unit having a configuration differing from circular.

We claim:

1. A magneto-resistive device comprising a support of magnetic material having an end face, a layer of insulating material applied to said end face of said magnetic support, a thin disc of magneto-resistive material secured by the lower face thereof to said layer of insulating material, means establishing an electrical connection between the central portion of said disc and the corresponding surface portion of said magnetic support, and an electrode ring electrically connected to the peripheral portion of said disc.

2. A magneto-resistive device as defined in claim 1 and which further includes a masking layer secured to the upper face of said disc of magneto-resistive material.

3. A magneto-resistive device as defined in claim 1 wherein said disc of magneto-resistive material is annular and said electrical connection between the central portion of said disc and the corresponding surface portion of said magnetic support includes conductive material extending through the opening in the center of said disc to said magnetic support.

4. A magneto-resistive device as defined in claim 1 wherein the end face of said magnetic support includes a centrally located raised portion which lies in direct contact with the central portion of said disc of magneto-resistive material to establish the electrical connection therebetween.

5. A magneto-resistive device as defined in claim 1 and which further includes an insulating sleeve surrounding said magnetic support adjacent its end face, a first conductive ring on said insulating sleeve and a second conductive ring on said first conductive ring and which is also electrically connected to said electrode ring which is connected to the peripheral portion of said disc.

6. A magneto-resistive device as defined in claim 1 wherein said disc of magneto-resistive material is annular and wherein said magnetic support is constituted by an annulus of magnetic material which is concentric with said annular disc and a central portion within said annulus which is non-magnetic thereby to concentrate the magnetic field in said annular disc.

7. A method of preparing a magneto-resistive element which comprises securing the lower face of a thin discrete disc of magneto-resistive material to the surface of a support member, providing on said support electrical terminal means for said disc, working the upper face of said disc to present a plane surface, and establishing electrical connection between separate regions of said disc and said terminal means.

8. A method of preparing a magneto-resistive element which comprises securing the lower face of a thin discrete disc of magneto-resistive material to the surface of a support member, said support member being electrically conductive at least in an intermediate region of said surface, said disc lying over said intermediate region, providing on said support an electrical terminal means extending about said intermediate region, working the upper face of said disc to present a plane surface, establishing electrical connection between one part of said disc and said intermediate region of said support, and establishing electrical connection between said terminal means and a further part of said disc.

9. A method of preparing a magneto-resistive element which comprises applying a layer of an electrical insulation medium to an electrically conductive surface of a support member, securing the lower face of a thin discrete disc of magneto-resistive material to the surface of said insulation layer, providing an insulating boundary to said conductive surface, providing electrical terminal means on said support member without and contiguous with said insulating boundary, working the upper face of said disc of magneto-resistive material to present a plane surface, establishing electrical connection between said terminal means and a region of said disc of magneto-resistive material adjacent said insulating boundary, and establishing electrical connection between said electrically conductive surface and an intermediate region of said disc of magneto-resistive material within and spaced from the vicinity of said insulation boundary.

10. The method as defined in claim 9 and which comprises the further steps of penetrating said layer of the electrical insulation medium, and applying an electrically conductive element in contact with the intermediate region of said disc of magneto-resistive material and said electrically conductive surface.

11. The method as defined in claim 9 and which comprises the further steps of shaping said electrically conductive surface to provide an intermediate raised portion, excluding said layer of the electrical insulation medium from said raised portion, and establishing direct electrical contact between said raised portion of said surface and said intermediate region of said disc of magneto-resistive material.

References Cited in the file of this patent

UNITED STATES PATENTS

| | | |
|---|---|---|
| 2,736,858 | Welker | Feb. 28, 1956 |
| 2,745,284 | Fitzgerald | May 15, 1956 |
| 2,792,620 | Kohring | May 21, 1957 |
| 2,828,396 | Forman et al. | Mar. 25, 1958 |
| 2,849,583 | Pritikin | Aug. 26, 1958 |
| 2,942,331 | Smiley | June 28, 1960 |
| 2,983,889 | Green | May 9, 1961 |